(No Model.)

P. P. NUNGESSER.
DYNAMO OR MAGNETO ELECTRIC MACHINE.

No. 287,774. Patented Oct. 30, 1883.

Attest:
Walter Donaldson
F. L. Middleton

Inventor
Ph. P. Nungesser
by Joyce & Spear
Attys.

UNITED STATES PATENT OFFICE.

PHILIP P. NUNGESSER, OF CLEVELAND, OHIO.

DYNAMO OR MAGNETO ELECTRIC MACHINE.

SPECIFICATION forming part of Letters Patent No. 287,774, dated October 30, 1883.

Application filed September 25, 1883. (No model.)

*To all whom it may concern:*

Be it known that I, PHILIP P. NUNGESSER, of Cleveland, in the county of Cuyahoga and State of Ohio, have invented a new and useful Improvement in Dynamo or Magneto Electric Machines; and I do hereby declare that the following is a full, clear, and exact description of the same.

My invention relates to the cooling of dynamo or magneto electrical machines; and it consists of a special and improved form of air-forcing device adapted to be fixed to the ends of the rotating armature, and to force air to the interior of said armature, and thence through openings in the periphery to the outside. Heretofore various devices have been used for this purpose—such as exterior blowing-machines adapted to force air into or upon the machine—and wings have been placed on the shaft of the revolving armature in order to deflect currents of air against parts liable to be heated, as in the United States Patent of Wirsching, of November 15, 1881. My special object is to force air positively, by means of a simple device, into the interior of the hollow armature from both ends toward the center, and to cause the air thus driven or compressed into the interior to escape in forcible currents through openings in the periphery of the armatures. I thus propose to maintain an active and rapid circulation of air through the apparatus, and to keep all the parts perfectly cool.

Figure 1:
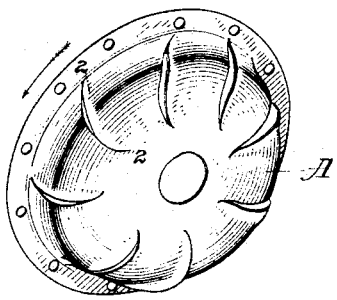
Figure 2:
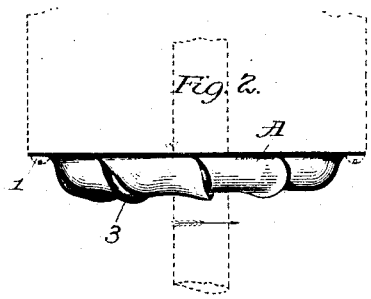
Figure 3:
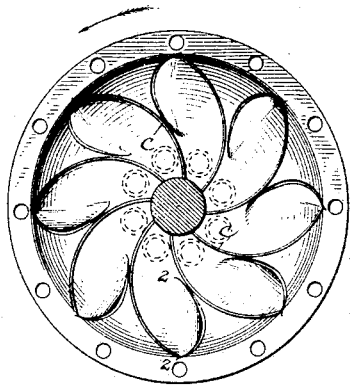

In the accompanying drawings, Figure 1 is a perspective view of the outside of the disk. Fig. 2 shows an edge elevation with the armature in outline. Fig. 3 is an inside view of the disk.

The air-forcing device consists of a disk, A, spun or otherwise formed in an approximately saucer shape, to form a shallow chamber, with an annular flange, $a$, by means of which it may be fastened by screws 1 to the armature. The disk is cut on curved lines 2 2, as shown, and the lip, on one side of each cut, is bent or pressed slightly outward to form a flange or hood, 3, adapted to catch the air as the armature revolves and direct it to the interior thereof. As many of these hoods may thus be formed as may be desired. The hoods for the opposite ends are formed in reverse direction, so that when in place they may all face in the direction in which the armature revolves. When in place upon the armature, the disk forms a practically close chamber of the interior, excepting the escape-openings in the periphery. The interior of the armature is hollow or formed with tubular passages running parallel with the axis and through the armature. The tubes, if used, have radial openings to permit the air to diverge to all parts of the armature. In order the more directly to force the air to these passages or to the hollow interior, I place guide-flanges $c$ on the inside of the disk, and in the position shown in Fig. 3, in order to catch the currents from the hoods and direct them to the passages. It will be understood that there are lateral or peripheral openings, through which the air is driven both by the force of the hoods and the centrifugal action of the revolving armature.

I claim as my invention—

1. In combination with the revolving armature of a dynamo-electrical machine, a disk, A, having a shallow chamber, and hoods 3, said disk being fastened to the end of the armature, and adapted to force air to the interior, substantially as described.

2. In combination with the chambered disk having hoods, and with the revolving armature, the guide-flange $c$, placed in the relation to the interior passages or opening of the armature, substantially as described.

In testimony whereof I have signed my name to this specification in the presence of two subscribing witnesses.

PHILIP P. NUNGESSER.

Witnesses:
   FRANK L. MIDDLETON,
   WALTER DONALDSON.